US005270499A

United States Patent [19]

Marchuk et al.

[11] Patent Number: 5,270,499

[45] Date of Patent: Dec. 14, 1993

[54] DIVERGENT COLLAPSIBLE SEAL

[75] Inventors: Jeffrey P. Marchuk, Ft. Lauderdale; John C. Dzung, Sunrise; Faris S. Habbaba, Boca Raton, all of Fla.

[73] Assignee: Motorola, Inc., Schaumburg, Ill.

[21] Appl. No.: 623,480

[22] Filed: Dec. 7, 1990

[51] Int. Cl.[5] ........................ H01H 13/06; F16J 15/02

[52] U.S. Cl. .................................... 200/5 A; 277/205; 455/90; 200/302.2

[58] Field of Search ................. 200/5 A, 302.2, 302.3, 200/512; 277/205; 49/479; 174/52.3-52.4; 181/149; 379/369, 370, 428, 429, 433, 440, 175; 455/89, 90, 128, 347-351

[56] References Cited

U.S. PATENT DOCUMENTS

| | | | |
|---|---|---|---|
| 3,390,890 | 7/1968 | Kurtz | 277/205 |
| 3,959,610 | 5/1976 | Finnegan et al. | 200/5 A |
| 4,636,593 | 1/1987 | Novak et al. | 200/5 A |
| 4,719,322 | 1/1988 | Guzik et al. | 200/5 A |
| 4,922,070 | 5/1990 | Dorinski | 200/512 |

*Primary Examiner*—A. D. Pellinen
*Assistant Examiner*—Michael A. Friedhofer
*Attorney, Agent, or Firm*—Juliana Agon

[57] ABSTRACT

Briefly, according to the invention, a compression seal between two surfaces is provided by a body portion (212) conforming between the two surfaces (110 and 130). A first (211) and second (311) rim are connected to a perimeter of the body portion (212). For providing a seal between the two surfaces when the two surfaces are compressed against each other, the second rim is connected to the first rim at an angle (216) between 0 and 180 degrees.

14 Claims, 2 Drawing Sheets

DIVERGENT COLLAPSIBLE SEAL

TECHNICAL FIELD

This invention relates generally to seals and more particularly to those seals that find application in communication devices such as a radio which utilizes keypads or speakers.

BACKGROUND

One example for the use of a seal in a radio is in a keypad assembly to environmentally protect the radio. In the prior art, keypad sheet include ridges on the surface of the sheet or a tiny seal rib on the edge for producing a seal when the keypad itself is compressed between the keypad cover and the radio housing. However, the height of the seal rib or the ridges limit the range of the compression that can be achieved. In addition, assembly dependence still occurred. Since the ridge or rim was only elevated in one direction, the amount of compression was critical to produce an optimum compression seal between the mating parts which have tolerances associated with them.

Therefore there is a need for an optimum compression seal that can be used on a keypad that allows for a lower compression load requirement and less assembly dependence.

SUMMARY OF THE INVENTION

Accordingly, it is an advantage of the present invention to provide an optimum compression seal to be reliable over wide assembly tolerances in a high pressure environment such as water submersion.

Briefly, according to the invention, a compression seal between two surfaces is provided by a body portion conforming between the two surfaces. A first and second rim are connected to a perimeter of the body portion. For providing a seal between the two surfaces when the two surfaces are compressed against each other, the second rim is connected to the first rim at an angle between 0 and 180 degrees.

DETAILED DESCRIPTION OF THE PREFERRED EMBODIMENT

Figure 1:
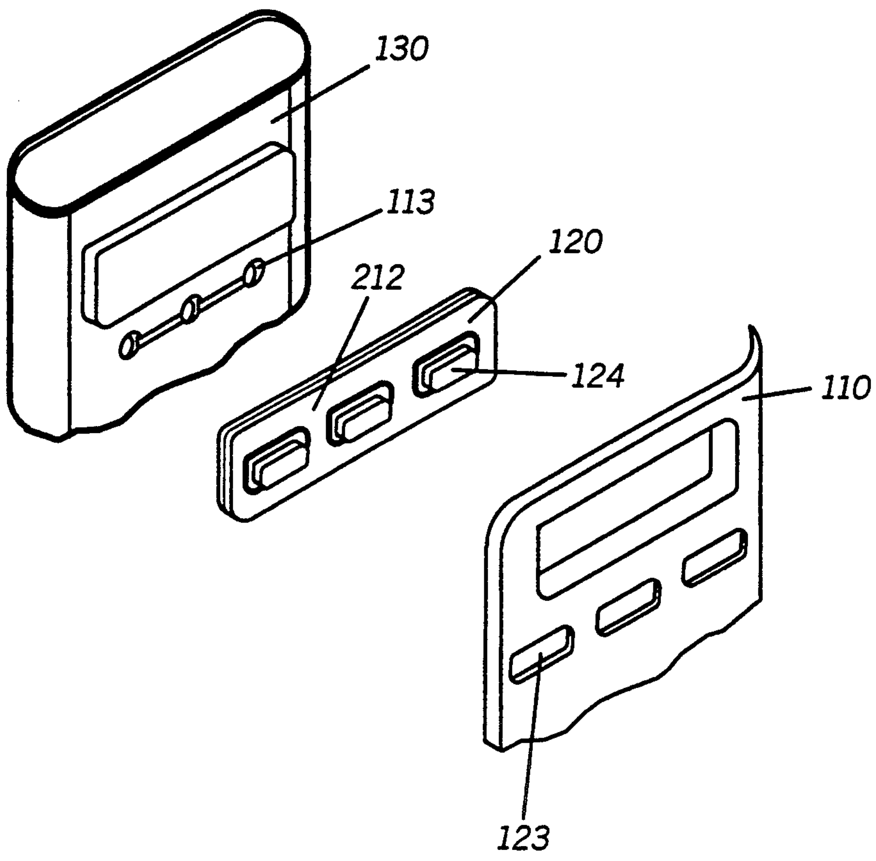
FIG. 1 is an exploded view of a keypad assembly including a key pad embodying the present invention.

Referring to FIG. 1, there is illustrated a keypad assembly for a radio including a keypad cover or grille 110, a housing 130, and a keypad 120 embodying the present invention. The housing 130 includes at least actuator apertures 113. Both the grille 110 and the housing 130 are preferably made of a rigid material.

The keypad 120 is a one piece layer including a plurality of keys 124 which protrude from a flat sheet 212 of a predetermined thickness. Keys 124 extend above the top surface of the body portion or keypad sheet 212. To provide for tactile feel, the keypad 120 is preferably comprised of an elastomeric material that is relatively soft. In the preferred embodiment of the present invention the keypad 120 is comprised of silicone rubber. The keys 124 may be rectangular, circular, square or any other suitable shape. Each key 124 has a protrusion or actuator extending from the rear surface of the pad that is partially inserted into the corresponding actuator aperture 113 in the housing 130.

The grille 110 includes holes or key apertures 123 through which the keys 124 of the keypad 120 insert. The grille 110 is positioned over the keypad 120 and bonded to the housing 130 utilizing any standard attachment process. According to a feature of the present invention, the grille 110 and the underlying structural elements may have curved or irregular surfaces. Since the elastomeric keypad 120 is flexible it will conform to the curve or irregular surfaces of the grille 110 and any underlying structural elements.

Figure 2:
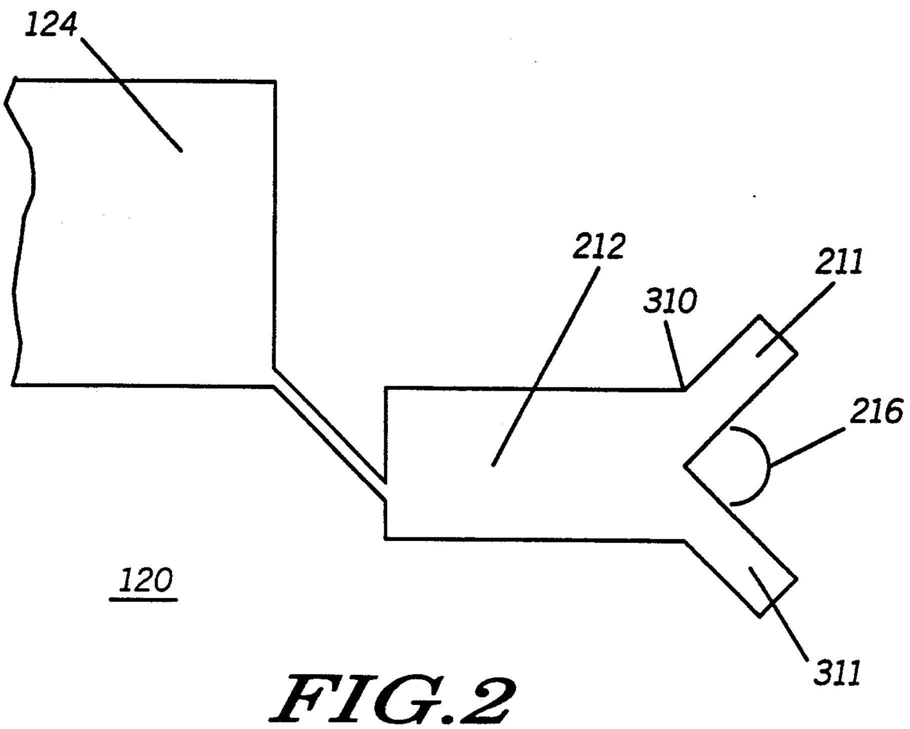
FIG. 2 is a cross sectional view of the keypad seal of FIG. 1 before compression.

Referring to FIG. 2, there is illustrated a cross sectional view of the elastomeric keypad 120 of FIG. 1, wherein the structure of the keypad seal is more clearly shown. According to a feature of the present invention, the keypad 120 includes a forked, "V" shaped, or double rim 310 for producing an optimum compression seal when compressed between the grille 110 and the housing 130 of FIG. 1. The forked rim 310, as part of the keypad 120, is preferably comprised of an elastomer and therefore will conform to and accommodate uneven or irregular surfaces of the housing 130 and of the grille 110. Moreover, the forked rim 310 need not be captivated by a corresponding slot in the grille 110 and the housing 130 to produce an optimum compression seal unlike the seal rib of the prior art.

To form an improved seal, the forked rim 310 comprises 2 edges, 211 and 311, which split and diverge at opposite angles. The edges, 211 and 311 are provided on the periphery of the keypad 120 to have any suitable shape, such as for example the substantially rectangular shape as represented. The edges, 211 and 311 are connected to each other, but diverge from each other at an angle 216 between 0 and 180 degrees and are connected to the body portion or sheet 212 of the keypad 120 at the periphery.

Figure 3:
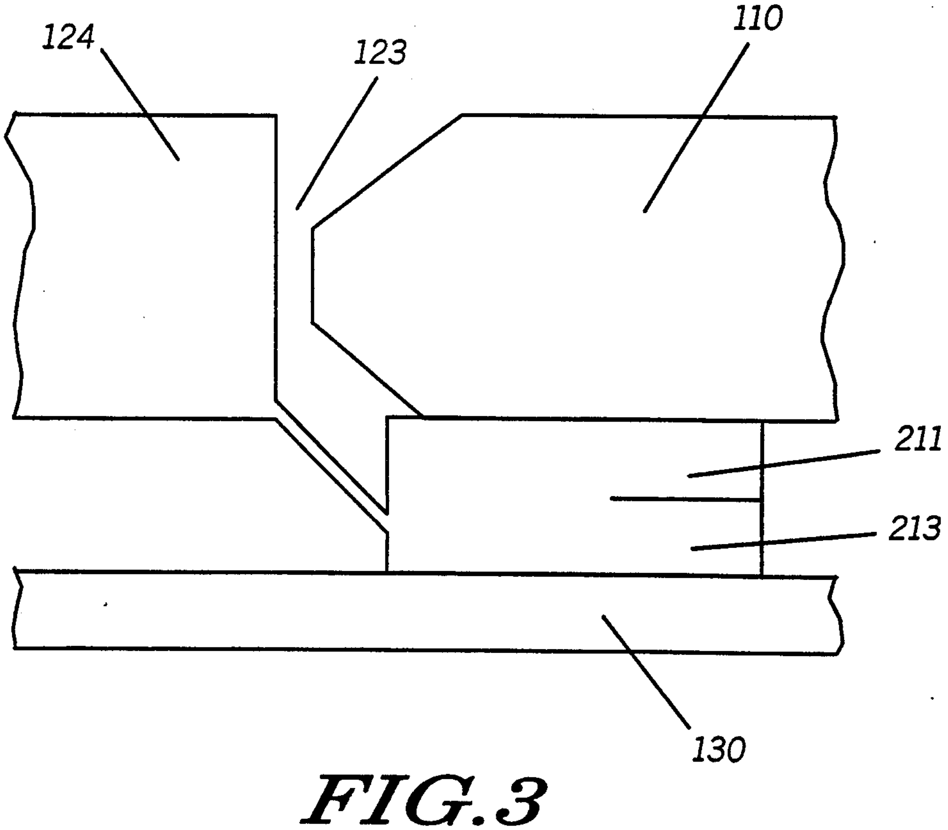
FIG. 3 is a cross sectional view of the keypad seal of FIG. 1 under compression.

Referring to FIG. 3, there is illustrated a cross sectional view of the elastomeric keypad 120 of FIG. 1, wherein the structure of the keypad seal is more clearly shown under compression. The two edges 211 and 311 of the keypad 120, acting as beams, are bent or collapsed, in approaching each other, to provide an optimum compression seal when the keypad 120 is sandwiched between the grille 110 and the housing 130. When the grille 110 is bonded to the housing 130, the two edges 211 and 311 are compressed against the rear surface of the grille 110 and the top surface of the housing 130 whereby they form a water tight seal to prevent moisture from entering the radio through the keypad cover or grille 110. Since the compression is in opposite directions (top and bottom of the keypad), the amount of collapse that is required to provide the compression is not critical thereby allowing wide tolerances between the mating parts (i.e. the grille 110 and the housing 130). The forked rim 310 thus provides for an environmental seal in a high pressure environment and over wide tolerances without requiring a high compression load.

In summary, a novel one piece elastomeric keypad has been described that produces an optimum compression seal when mounted in a housing. The split edges 211 and 311 of the keypad 120 act as beams which are bent to allow sealing over a significant range of compression without increasing the compression load over a wide tolerance range. The forked rim 310 on the edge of the keypad sheet produces an optimum compression seal when compressed against the housing 130 and the grille 110 of the keyboard assembly resulting in an environmental seal which enables the radio to be submersible in water.

This novel seal of the present invention can be advantageously used in any application requiring a seal between any other two surfaces that need to be compressed against each other. Another example of the seal for use in a radio could be as a speaker rim between a speaker grille and a radio housing.

We claim:

1. An elastomeric keypad adapted to be disposed between a housing and a keypad cover, said elastomeric keypad comprising:

sheet means having having a plurality of keys; and a horizontal V shaped rim disposed on an edge of said sheet means for producing an area of high compression both between the housing and the keypad cover;

said V shaped rim comprising:

a body portion conforming to the shape of portions of said housing and said keypad cover;

a first split edge connected to a perimeter of said body portion: and a second split edge connected to said perimeter of said body portion, said second split edge connected to and diverging from said first split edge, before compression, at an angle between 0 and 180 degrees, said first and second split edges approaching each other towards 0 degree, during compression, when said housing is compressed against said first split edge and said keypad cover is compressed against said second split edge.

2. A keypad assembly for a radio, comprising:

a housing for housing a radio;

a keypad cover; and a keypad having a plurality of keys and a V shaped rim disposed between said housing and said keypad cover;

said V shaped rim comprising;

a body portion conforming to the shape of portions of said housing and keypad cover;

a first split edge connected to a side perimeter of said body portion: and a second split edge connected to said side perimeter of said body portion, said second split edge connected to and diverging from said first split edge, before compression, at an angle between 0 and 180 degrees, said first and second split edges approaching each other towards 0 degree, during compression, when said housing is compressed against said first split edge and said keypad cover is compressed against said second split edge.

3. A sealing assembly for a radio, comprising:

a first radio element having a first body portion and a first rigid contact portion connected to said first body portion;

a second radio element having a second body portion and a second rigid contact portion connected to said second body portion; and an intermediate elastomeric collapsible seal disposed between said first and second radio elements;

said intermediate elastomeric collapsible seal comprising:

an intermediate body portion conforming to the shape of said first and second body portions of said first and second radio elements;

a first split edge connected to a perimeter of said intermediate body portion; and a second split edge connected to said perimeter of said intermediate body portion, said first and second split edges each connected to and each diverging from said perimeter of said intermediate body portion, before compression, at an angle between 0 and 180 degrees, said first and second split edges collapsible to 0 degree, during compression, when said first rigid contact portion is compressed against said first split edge and said second rigid contact portion is compressed against said second split edge.

4. The sealing assembly of claim 3, wherein said intermediate elastomeric collapsible seal is an integral radio element.

5. The sealing assembly of claim 3, wherein said first and second rigid contact portions are substantially flat surfaces.

6. The sealing assembly of claim 5, wherein said intermediate elastomeric collapsible seal is substantially planar to enable top and bottom compression by said substantially flat surfaces of said radio elements.

7. The sealing assembly of claim 3, further comprising bonding means for attaching said first radio element on top of said second element.

8. The sealing assembly of claim 3, further comprising:

a speaker having a speaker rim;

said first radio element comprises a speaker grille for covering said speaker;

said second radio element comprises a housing said speaker within said radio;

said intermediate elastomeric collapsible seal disposed between said speaker grille and said housing, wherein said speaker rim is sandwiched between said first and second split edges of said intermediate elastomeric collapsible seal.

9. The sealing assembly of claim 3, wherein said first radio element comprises a keypad cover.

10. The sealing assembly of claim 3, wherein said second radio element comprises a radio housing for housing said radio.

11. The sealing assembly of claim 3, wherein said intermediate elastomeric collapsible seal comprises a keypad.

12. The sealing assembly of claim 9, wherein said intermediate elastomeric collapsible seal comprises a keypad.

13. The sealing assembly of claim 12, wherein said second radio element comprises a radio housing for housing said radio.

14. The sealing assembly of claim 3, wherein said intermediate body portion comprises a sheet.

* * * * *

UNITED STATES PATENT AND TRADEMARK OFFICE

CERTIFICATE OF CORRECTION

PATENT NO. : 5,270,499

DATED : December 14, 1993

INVENTOR(S) : Marchuk et al.

It is certified that error appears in the above-identified patent and that said Letters Patent is hereby corrected as shown below:

Column 4, claim 8, line 39, after "housing" and before "said" insert -- for housing --.

Signed and Sealed this

Twenty-eighth Day of June, 1994

Attest:

Bruce Lehman

BRUCE LEHMAN

*Attesting Officer*

*Commissioner of Patents and Trademarks*